(12) United States Patent
Jiang et al.

(10) Patent No.: US 11,644,391 B2
(45) Date of Patent: May 9, 2023

(54) FAULT DIAGNOSIS METHOD UNDER CONVERGENCE TREND OF CENTER FREQUENCY

(71) Applicant: SOOCHOW UNIVERSITY, Suzhou (CN)

(72) Inventors: Xingxing Jiang, Suzhou (CN); Changqing Shen, Suzhou (CN); Jianqin Zhou, Suzhou (CN); Dongmiao Song, Suzhou (CN); Wenjun Guo, Suzhou (CN); Guifu Du, Suzhou (CN); Jun Wang, Suzhou (CN); Juanjuan Shi, Suzhou (CN); Weiguo Huang, Suzhou (CN); Zhongkui Zhu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 101 days.

(21) Appl. No.: 17/414,939

(22) PCT Filed: Jul. 30, 2020

(86) PCT No.: PCT/CN2020/105689
§ 371 (c)(1),
(2) Date: Jun. 16, 2021

(87) PCT Pub. No.: WO2021/027579
PCT Pub. Date: Feb. 18, 2021

(65) Prior Publication Data
US 2022/0050024 A1    Feb. 17, 2022

(30) Foreign Application Priority Data

Aug. 14, 2019   (CN) .......................... 201910750064.6

(51) Int. Cl.
*G06F 11/30* (2006.01)
*G01M 99/00* (2011.01)

(52) U.S. Cl.
CPC ................................. *G01M 99/005* (2013.01)

(58) Field of Classification Search
CPC ..................................................... G01M 99/005
See application file for complete search history.

(56) References Cited

U.S. PATENT DOCUMENTS 7,864,484 B2    1/2011   Kisaka et al.

FOREIGN PATENT DOCUMENTS

| CN | 10815202   | * | 6/2018 |
| CN | 108152025 A |   | 6/2018 |

(Continued)

OTHER PUBLICATIONS

Jiang et al., "Initial center frequency-guided VMD for fault diagnosis of rotating machines" Journal of Sound and Vibration 435 (2018) 36-55(Aug. 9, 2018) (Year: 2018).*

(Continued)

*Primary Examiner* — Phuong Huynh
(74) *Attorney, Agent, or Firm* — SZDC Law P.C.

(57) ABSTRACT

The present invention discloses a fault diagnosis method under a convergence trend of a center frequency, including: (1) acquiring a dynamic signal x(t) of a rotary machine equipment; (2) setting initial decomposition parameters of a variational model; (3) decomposing the dynamic signal x(t) by using the variational model with the set initial decomposition parameters, and traversing a signal analysis band and performing iterative decomposition on the dynamic signal x(t) under the guidance of a convergence trend of a center frequency, to obtain optimized modals $\{m_1 \ldots m_n \ldots m_N\}$ and corresponding center frequencies $\{\omega_1 \ldots \omega_n \ldots \omega_N\}$; (4) searching a fault related modal $m_f$, guiding (Continued)

parameter optimization by using a center frequency $\omega_I$ of the fault related modal $m_I$, and retrieving an optimal target component $\overline{m}_I$ including fault information; and (5) performing envelopment analysis on the optimal target component $\overline{m}_I$, and diagnosing the rotary machine equipment according to an envelope spectrum.

7 Claims, 5 Drawing Sheets

(56) References Cited

FOREIGN PATENT DOCUMENTS

| | | |
|---|---|---|
| CN | 109613399 A | 4/2019 |
| CN | 110427916 A | 11/2019 |

OTHER PUBLICATIONS

Jiang et al., "Initial center frequency-guided VMD for fault diagnosis of rotating machines" Journal of Sound and Vibration 435 (2018) 36-55 (Aug. 9, 2018).

Wang, "Some further thoughts about spectral kurtosis, spectral L2/L1 norm, spectral smoothness index and spectral Gini index for characterizing repetitive transients" Mechanical Systems and Signal Processing 108 (2018) 360-368 (Dec. 31, 2018).

* cited by examiner

FAULT DIAGNOSIS METHOD UNDER CONVERGENCE TREND OF CENTER FREQUENCY

This application is the National Stage Application of PCT/CN2020/105689, filed on Jul. 30, 2020, which claims priority to Chinese Patent Application No. 201910750064.6, filed on Aug. 14, 2019, which is incorporated by reference for all purposes as if fully set forth herein.

FIELD OF THE INVENTION

The present invention relates to the technical field of diagnosing weak faults in machines, and more particularly to a fault diagnosis method under a convergence trend of a center frequency.

DESCRIPTION OF THE RELATED ART

Rotary machine equipment has been widely applied in industrial production. The status of machine parts directly affects the operating status and the safety status of the machine equipment. When a fault occurs in machine parts, a periodic instantaneous impulse response is generated. How to effectively retrieve and accurately evaluate such periodic instantaneous impulse response is the key to bearing fault diagnosis. However, due to the complexity of an actual operating environment, a dynamic signal acquired on site from equipment includes a large amount of noise. A weak fault feature in the signal is usually overwhelmed in the noise, leading to severe impact on the recognition of a fault feature signal. Therefore, it is of practical significance to retrieve and determine an instantaneous feature of a weak fault in a machine.

At present, many fault diagnosis methods for machines, for example, conventional weak fault diagnosis methods such as a time-frequency domain analysis method, empirical modal decomposition, and local mean decomposition, have been developed. However, these conventional methods have respective limitations, for example, problems such as the difficulty in selecting a stopping criterion and relatively poor anti-noise performance, which results in the limited application ranges. A variational modal decomposition method is an adaptive signal decomposition method based on a variational model and has relatively high noise immunity, and a non-filtering decomposition manner is used to decompose a signal to reduce transfer errors. In recent years, scholars have gradually introduced the variational modal decomposition method in the field of machine signal processing, and have developed a bearing fault diagnosis method based on a combination of variational modal decomposition and a classification model; have utilized the application of the variational modal decomposition method in the fault diagnosis of a rolling bearing in a multistage centrifugal pump; and have extended the applicability of variational modal decomposition in system recognition of structures. However, at present, when the variational modal decomposition method is used to process a machine signal, it is very difficult to predict an actual center frequency and a quantity of modal components in an original dynamic signal of equipment and it is very difficult to completely retrieve an optimal balance parameter of a corresponding target component.

SUMMARY OF THE INVENTION

The present invention provides a fault diagnosis method under a convergence trend of a center frequency. Based on a variational modal decomposition method, a decomposition manner under the guidance of a convergence trend of a center frequency is used to implement intelligent decomposition for diagnosing an original dynamic signal of target equipment, to overcome the difficulty of setting initial parameters in a conventional variational modal decomposition method, so that an acquired dynamic signal of the equipment can be adaptively analyzed, and it becomes less difficult for a technician to perform fault diagnosis on a machine by using a variational modal decomposition method.

To resolve the foregoing technical problem, the present invention provides a fault diagnosis method under a convergence trend of a center frequency, including the following steps:

(1) acquiring a dynamic signal x(t) of a diagnosis target by using a sampling frequency $f_s$;

(2) setting initial decomposition parameters of a variational model: an initial center frequency $\omega_0$ is 0, an increase step size $\Delta\omega$ of the initial center frequency is 100 Hz, an initial step count z is 1, a balance parameter $\alpha$ is [1000, 4000], and a quantity K of modal components is 1;

(3) performing primary decomposition on the dynamic signal x(t) by using the variational model with the set initial decomposition parameters, determining a convergence trend of a center frequency, and traversing a signal analysis band and performing iterative decomposition on the dynamic signal x(t) under the guidance of the convergence trend of the center frequency, to obtain optimized modals $\{m_1 \ldots m_n \ldots m_N\}$ and corresponding center frequencies $\{\omega_1 \ldots \omega_n \ldots \omega_N\}$;

(4) searching the obtained optimized modals $\{m_1 \ldots m_n \ldots m_N\}$ for a fault related modal $m_f$, guiding parameter optimization by using the center frequency $\omega_f$ of the fault related modal $m_f$, and retrieving an optimal target component $\overline{m_f}$ including fault information; and (5) performing envelopment analysis on the retrieved optimal target component $\overline{m_f}$, and diagnosing a rotary machine equipment according to an envelope spectrum of the target component.

In a preferred embodiment of the present invention, in step (3), a constraint model in the variational model is calculated by using an alternating direction method of multipliers:

$$L(m_k, \omega_k) = \alpha \sum_{k=1}^{K} \left\| \partial_t \left[ \left( \delta(t) + \frac{j}{\pi t} \right) * m_k \right] e^{-j\omega_k t} \right\|_2^2 + \left\| x(t) - \sum_{k=1}^{K} m_k \right\|_2^2,$$

where in the formula, x(t) is the dynamic signal, * represents a convolution operator, $\partial_t$ represents calculating a partial derivative of time t, $\delta(t)$ is a Dirichlet distribution function, and an exponential regulation item $e^{-j\omega_k t}$ is used for translating the frequency spectrum of each component; and the signal x(t) is decomposed into K modal components $m_k$(k=1, 2, 3 . . . K), where each modal component $m_k$ surrounds its center frequency $\omega_k$.

In a preferred embodiment of the present invention, performing iterative decomposition on the dynamic signal x(t) under the guidance of the convergence trend of the center frequency includes:

(S31) performing primary decomposition on the dynamic signal x(t) by using the variational model with the set initial decomposition parameters, to obtain the updated center frequency $\omega_1$;

(S32) determining a convergence trend $e=\omega_1-\omega_0$ of the center frequency: if the convergence trend $e=\omega_1-\omega_0$ is an upward trend, outputting a corresponding modal component as the optimized modal $m_n$, where the corresponding center frequency $\omega_n$ is a retrieved optimal center frequency; or if the convergence trend $e=\omega_1-\omega_0$ is a downward trend, making $\omega_0=\omega_0+z\Delta\omega$, and simultaneously determining whether to traverse the entire band, and if $\omega_0=(\omega_0+z\Delta\omega)<f_s/2$, returning to step (S31), or otherwise, stopping the iterative decomposition; and (S33) updating the initial center frequency $\omega_0$ with the retrieved optimal center frequency $\omega_n$, and if the new center frequency $\omega_0<f_s/2$, returning to step (S31), or otherwise, stopping the iterative decomposition.

In a preferred embodiment of the present invention, in step (4), during the searching the obtained optimized modals $\{m_1 \ldots m_n \ldots m_N\}$ for the fault related modal $m_f$, the fault related modal is determined by calculating Gini index values of the optimized modals $\{m_1 \ldots m_n \ldots m_N\}$.

In a preferred embodiment of the present invention, in step (4), guiding parameter optimization by using the center frequency $\omega_f$ of the fault related modal $m_f$, and retrieving an optimal target component $\overline{m_f}$ including fault information includes:

(S51) setting two groups of initial decomposition parameters: a balance parameter is $\alpha=\alpha_0+\Delta\alpha$, a quantity of modal components is K=1, and an initial center frequency is $\omega_f$; and a balance parameter $\alpha=\alpha_0-\Delta\alpha$, a quantity of modal components is K=1, and an initial center frequency is $\omega_f$, where $\Delta\alpha$ is the step size of the change in the balance parameter $\alpha$;

(S52) respectively decomposing the original dynamic signal x(t) by using the two groups of initial decomposition parameters set in step (S51), to obtain two groups of modal components $Ur_1$ and $Ul_1$;

(S53) respectively calculating Gini index values $Gnir_1$ and $Gnil_1$ of the modal components $Ur_1$ and $Ul_1$; and (S54) determining the values of $Gnir_1$ and $Gnil_1$:

if $Gnir_1 > Gnil_1$, performing an optimization solution of incrementing a balance parameter; or otherwise, performing an optimization solution of decrementing a balance parameter.

In a preferred embodiment of the present invention, the optimization solution of incrementing a balance parameter includes:

(S61) setting decomposition parameters: a balance parameter is $\alpha=\alpha_0+i\Delta\alpha(i=2)$, a quantity of modal components is K=1, and an initial center frequency is $\omega_f$;

(S62) decomposing the original dynamic signal x(t) by using the decomposition parameters set in the step (S61), to obtain the modal component $Ur_i$, and calculating a Gini index value $Gnir_i$ of the modal component $Ur_i$; and (S63) determining the values of $Gnir_i$ and $Gnir_{i-1}$, and if $Gnir_i > Gnir_{i-1}$, making i=i+1 and returning to step (S61); or otherwise, making $\overline{m_f}=Ur_{i-1}$.

In a preferred embodiment of the present invention, the optimization solution of decrementing a balance parameter includes:

(S71) setting decomposition parameters: a balance parameter is $\alpha=\alpha_0-i\Delta\alpha(i=2)$, a quantity of modal components is K=1, and an initial center frequency is $\omega_f$;

(S72) decomposing the original dynamic signal x(t) by using the decomposition parameters set in step (S71), to obtain the modal component $Ul_i$, and calculating a Gini index value $Gnil_i$ of the modal component $Ul_i$; and (S73) determining the values of $Gnil_i$ and $Gnil_{i-1}$, and if $Gnil_i > Gnil_{i-1}$, making i=i+1, and returning to step (S71); or otherwise, making $\overline{m_f}=Ul_{i-1}$.

The beneficial effects of the present invention are as follows:

First, in the fault diagnosis method under a convergence trend of a center frequency in this embodiment of the present invention, based on a variational modal decomposition method, a decomposition manner under the guidance of a convergence trend of a center frequency is used to implement intelligent decomposition for diagnosing an original dynamic signal of target equipment, to overcome the difficulty of setting initial parameters in a conventional variational modal decomposition method, so that an acquired dynamic signal of the equipment can be adaptively analyzed, and it becomes less difficult for a technician to perform fault diagnosis on a machine by using a variational modal decomposition method.

Next, in the fault diagnosis method under a convergence trend of a center frequency in this embodiment of the present invention, based on the variational modal decomposition method, a decomposition manner under the guidance of a convergence trend of a center frequency is used, so that a convergence process of a decomposition algorithm can be accelerated, and at the same time the problems of modal aliasing and false components caused by a preset inappropriate quantity of modal components in decomposition in existing decomposition methods are avoided.

Third, in the fault diagnosis method under a convergence trend of a center frequency in this embodiment of the present invention, a center frequency is used to guide the adaptive optimization of a balance parameter, so that the bandwidth of an eventually obtained component can match the bandwidth of an actual faulty component to the greatest extent and the amount of calculation is reduced.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not intended to limit the present invention.

Embodiment

Figure 1:
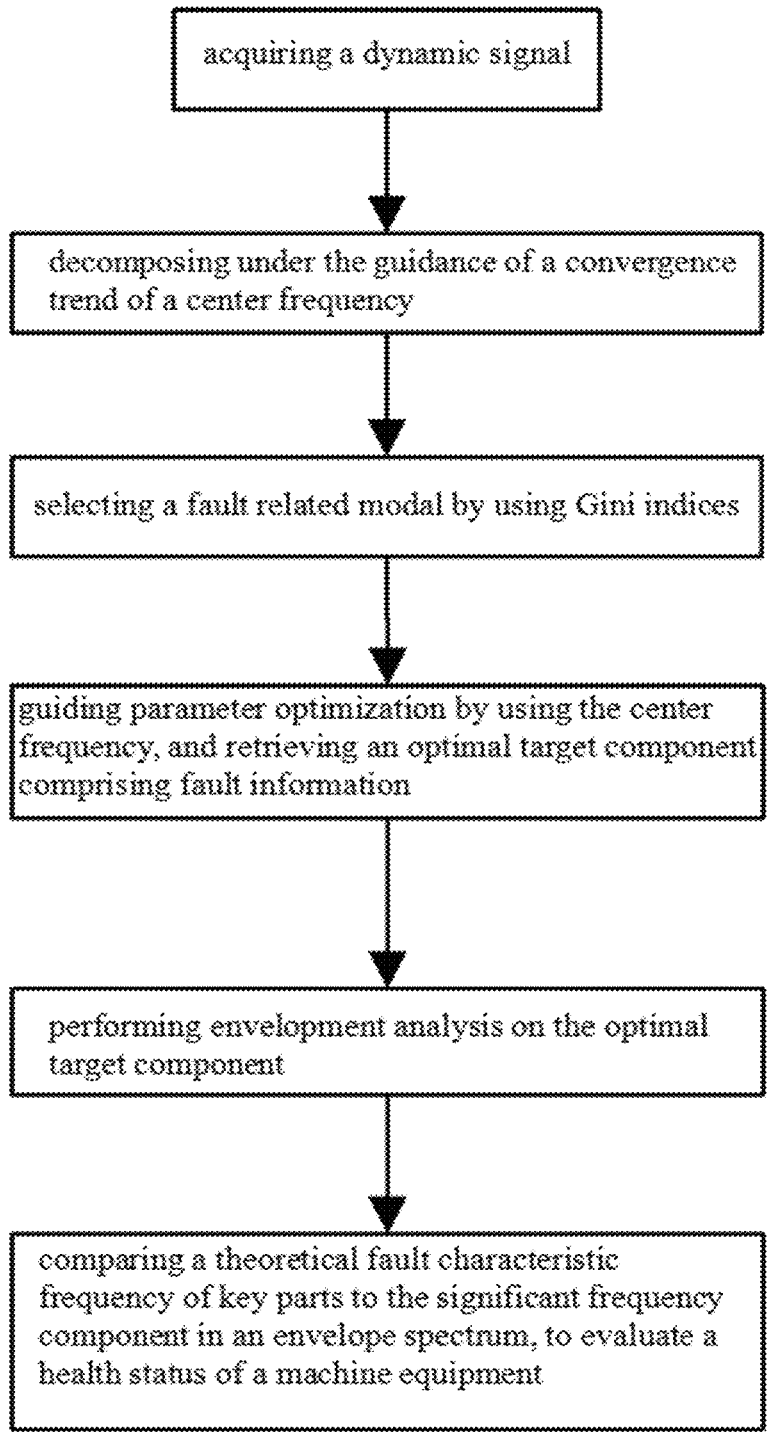
FIG. 1 is a flowchart of a fault diagnosis method according to an embodiment of the present invention.
Figure 4:
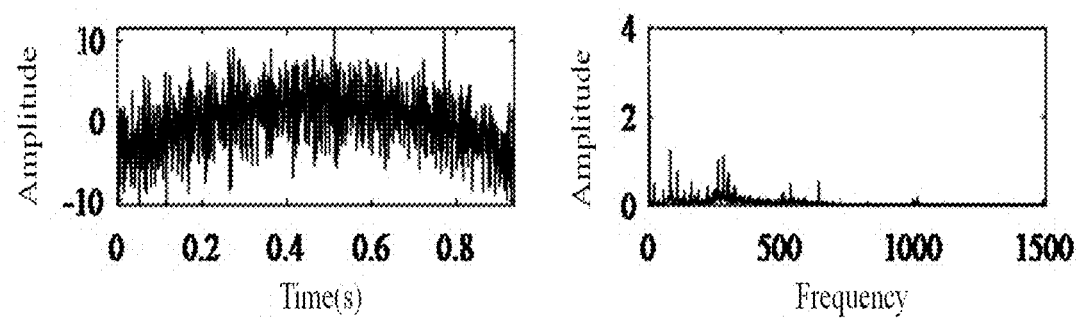
FIG. 4 is a waveform diagram of a group of acquired dynamic signals of damage of a gearbox.

This embodiment provides a fault diagnosis method under a convergence trend of a center frequency (under the guidance of a convergence trend of a center frequency). Referring to FIG. 1, the method includes the following steps:

(1) acquiring a group of dynamic signals x(t) of damage of a gearbox by using a sampling frequency $f_s$ with a dynamic signal sensor, wherein for a waveform diagram of the group of dynamic signals, reference may be made to FIG. 4.

(2) setting initial decomposition parameters of a variational model: it is set that an initial center frequency $\omega_0$ is 0, an increase step size $\Delta\omega$ of the initial center frequency is 100 Hz, an initial step count z is 1, a balance parameter $\alpha$ is [1000, 4000], and a quantity K of modal components is 1.

(3) performing primary decomposition on the dynamic signal x(t) by using the variational model with the set initial decomposition parameters, determining a convergence trend of a center frequency, and traversing a signal analysis band and performing iterative decomposition on the dynamic signal x(t) under the guidance of the convergence trend of the center frequency, to obtain optimized modals $\{(m_1 \ldots m_n \ldots m_N\}$ and corresponding center frequencies $\{\omega_1 \ldots \omega_n \ldots \omega_N\}$, wherein the signal analysis band is half the sampling frequency $f_s$.

Specifically, a constraint model in the variational model is calculated by using an alternating direction method of multipliers:

$$L(m_k, \omega_k) = \alpha \sum_{k=1}^{K} \left\| \partial_t \left[ \left( \delta(t) + \frac{j}{\pi t} \right) * m_k \right] e^{-j\omega_k t} \right\|_2^2 + \left\| x(t) - \sum_{k=1}^{K} m_k \right\|_2^2,$$

where in the formula, x(t) is the dynamic signal, * represents a convolution operator, $\partial_t$ represents calculating a partial derivative of time t, $\delta(t)$ is a Dirichlet distribution function, and an exponential regulation item $e^{-j\omega_k t}$ is used for translating the frequency spectrum of each component; and the signal x(t) is decomposed into K modal components $m_k$(k=1, 2, 3 . . . K), where each modal component $m_k$ surrounds its center frequency $\omega_k$.

Figure 2:
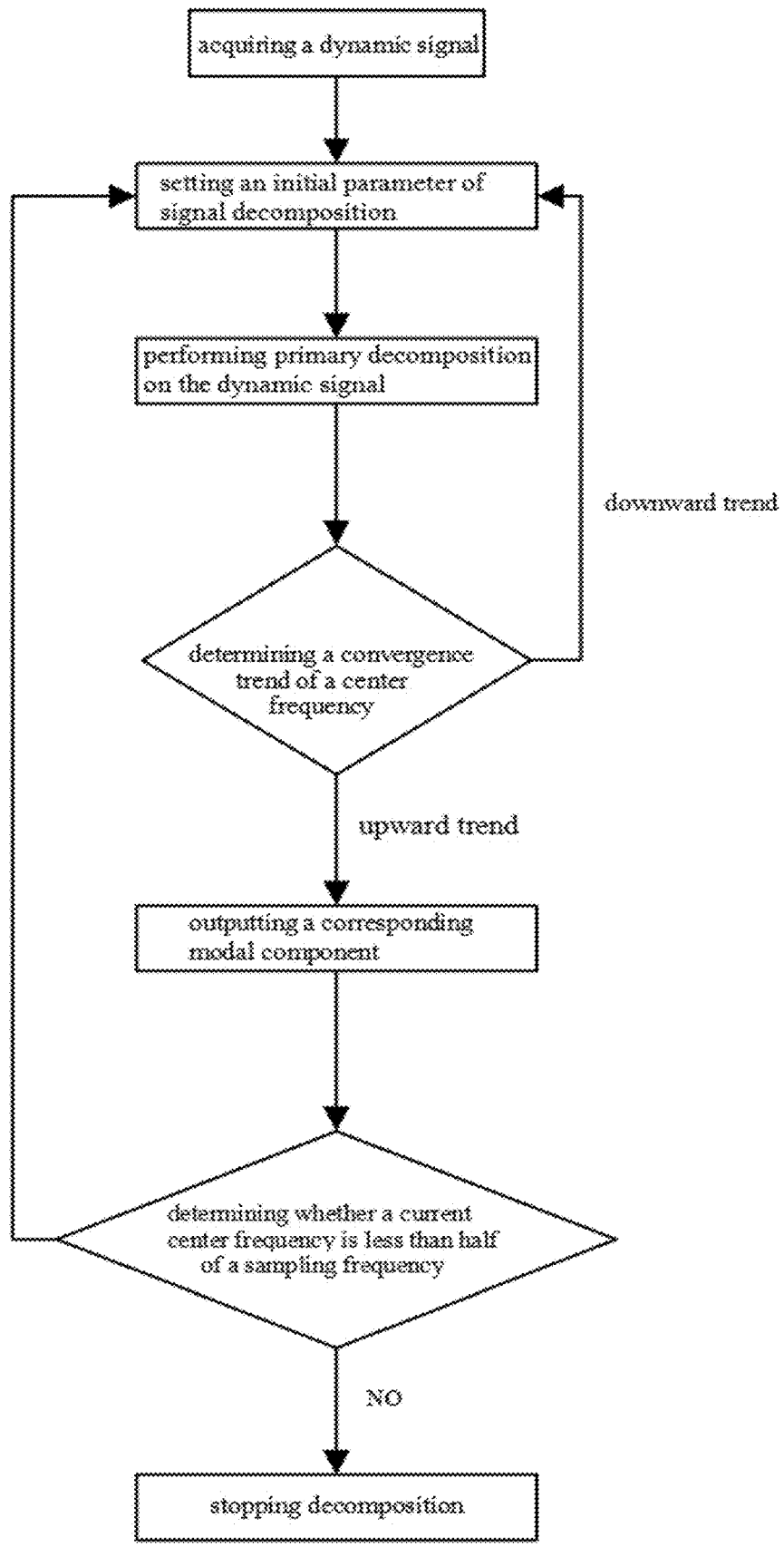
FIG. 2 is a flowchart of a process of decomposing a dynamic signal under the guidance of a convergence trend of a center frequency according to an embodiment of the present invention.

Referring to FIG. 2, a process of performing iterative decomposition on the dynamic signal x(t) under the guidance of the convergence trend of the center frequency includes:

(S31) performing primary decomposition on the dynamic signal x(t) by using the variational model with the initial decomposition parameters set in step (2), to obtain the updated center frequency $\omega_1$;

(S32) determining a convergence trend $e=\omega_1-\omega_0$ of the center frequency:

if the convergence trend $e=\omega_1-\omega_0$ is an upward trend, outputting a corresponding modal component as the optimized modal $m_n$, where the corresponding center frequency $\omega_n$ is a retrieved optimal center frequency; or if the convergence trend $e=\omega_1-\omega_0$ is a downward trend, making $\omega_0=\omega_0+z\Delta\omega$, and simultaneously determining whether to traverse the entire band, and if $\omega_0=(\omega_0+z\Delta\omega)<f_s/2$, returning to step (S31), or otherwise, stopping the iterative decomposition; and (S33) updating the initial center frequency $\omega_0$ with the retrieved optimal center frequency $\omega_n$, and if the new center frequency $\omega_0<f_s/2$, returning to step (S31), or otherwise, stopping the iterative decomposition.

(4) searching the obtained optimized modals $\{m_1 \ldots m_n \ldots m_N\}$ for a fault related modal $m_f$, guiding parameter optimization by using the center frequency $\omega_f$ of the fault related modal $m_f$, and retrieving an optimal target component $\overline{m_f}$ including fault information.

Figure 3:
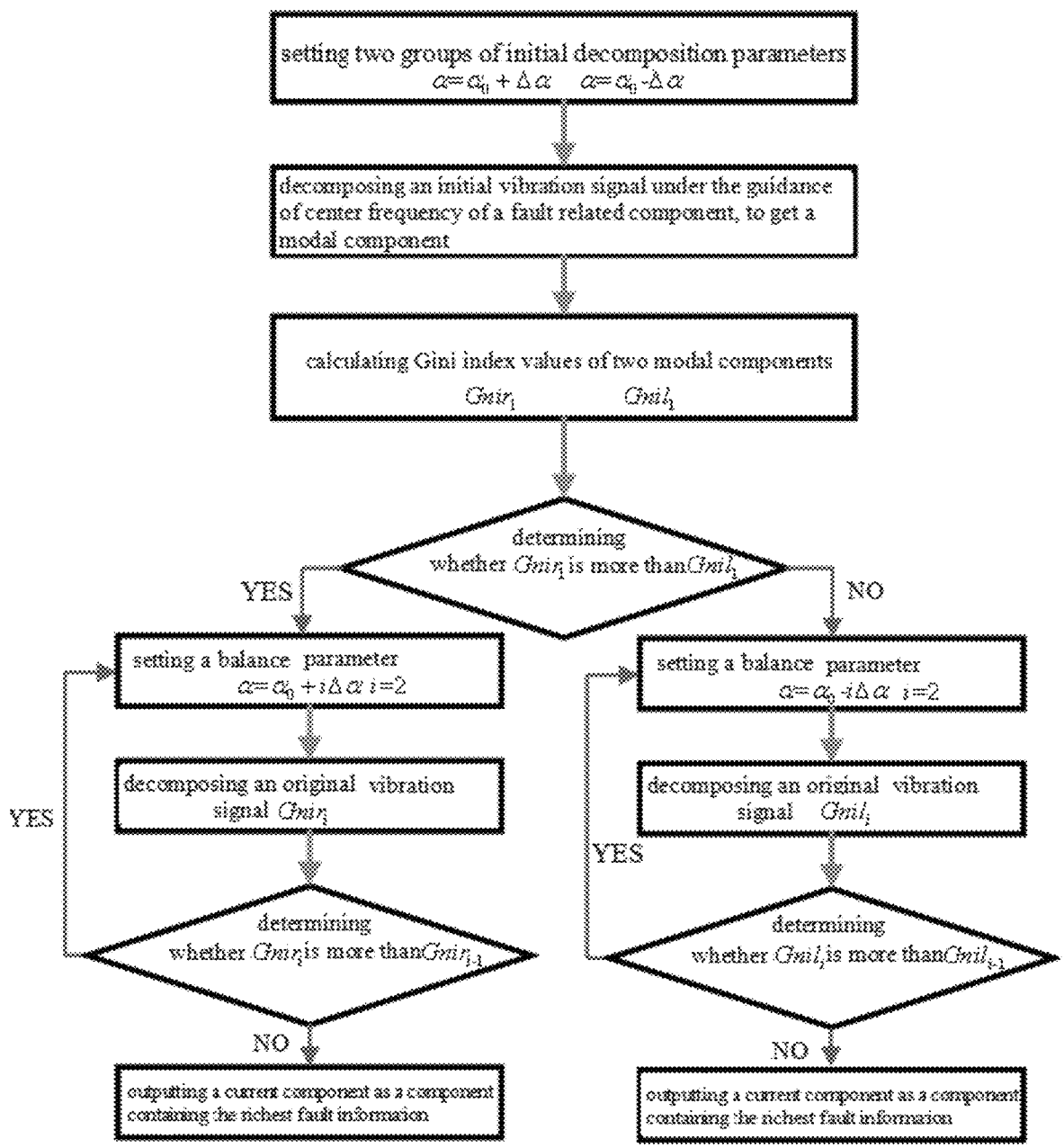
FIG. 3 is a flowchart of retrieving an optimal target component including fault information with guidance of parameter optimization by a center frequency according to an embodiment of the present invention.

Specifically, referring to FIG. 3, a process of guiding parameter optimization by using the center frequency $\omega_f$ of the fault related modal $m_f$, and retrieving an optimal target component $\overline{m_f}$ including fault information includes:

(S51) setting two groups of initial decomposition parameters: a balance parameter is $\alpha=\alpha_0+\Delta\alpha$, a quantity of modal components is K=1, and an initial center frequency is $\omega_f$; and a balance parameter $\alpha=\alpha_0-\Delta\alpha$, a quantity of modal components is K=1, and an initial center frequency is $\omega_f$, where $\Delta\alpha$ is the step size of the change in the balance parameter $\alpha$;

(S52) respectively decomposing the original dynamic signal x(t) by using the two groups of initial decomposition parameters set in step (S51), to obtain two groups of modal components $Ur_1$ and $Ul_1$;

(S53) respectively calculating Gini index values $Gnir_1$ and $Gnil_1$ of the modal components $Ur_1$ and $Ul_1$; and (S54) determining the values of $Gnir_1$ and $Gnil_1$:

if $Gnir_1>Gnil_1$, performing an optimization solution of incrementing a balance parameter; or otherwise, performing an optimization solution of decrementing a balance parameter.

The optimization solution of incrementing a balance parameter includes:

(S61) setting decomposition parameters: a balance parameter is $\alpha=\alpha_0+i\Delta\alpha$(i=2), a quantity of modal components is K=1, and an initial center frequency is $\omega_1$;

(S62) decomposing the original dynamic signal x(t) by using the decomposition parameters set in the step (S61), to obtain the modal component $Ur_i$, and calculating a Gini index value $Gnir_i$ of the modal component $Ur_i$; and (S63) determining the values of $Gnir_i$ and $Gnir_{i-1}$, and if $Gnir_i>Gnir_{i-1}$, making i=i+1, and returning to step (S61); or otherwise, making $\overline{m_f}=Ur_{i-1}$.

The optimization solution of decrementing a balance parameter includes:

(S71) setting decomposition parameters: a balance parameter is $\alpha=\alpha_0-i\Delta\alpha$(i=2), a quantity of modal components is K=1, and an initial center frequency is $\omega_f$;

(S72) decomposing the original dynamic signal x(t) by using the decomposition parameters set in step (S71), to obtain the modal component $Ul_i$, and calculating a Gini index value $Gnil_i$ of the modal component $Ul_i$; and (S73) determining the values of $Gnil_i$ and $Gnil_{i-1}$, and if $Gnil_i>Gnil_{i-1}$, making i=i+1, and returning to step (S71); or otherwise, making $\overline{m_f}=Ul_{i-1}$;

(5) performing envelopment analysis on the retrieved optimal target component $\overline{m_f}$, and diagnosing a health status of a rotary machine equipment according to an envelope spectrum of the target component.

Figure 5:
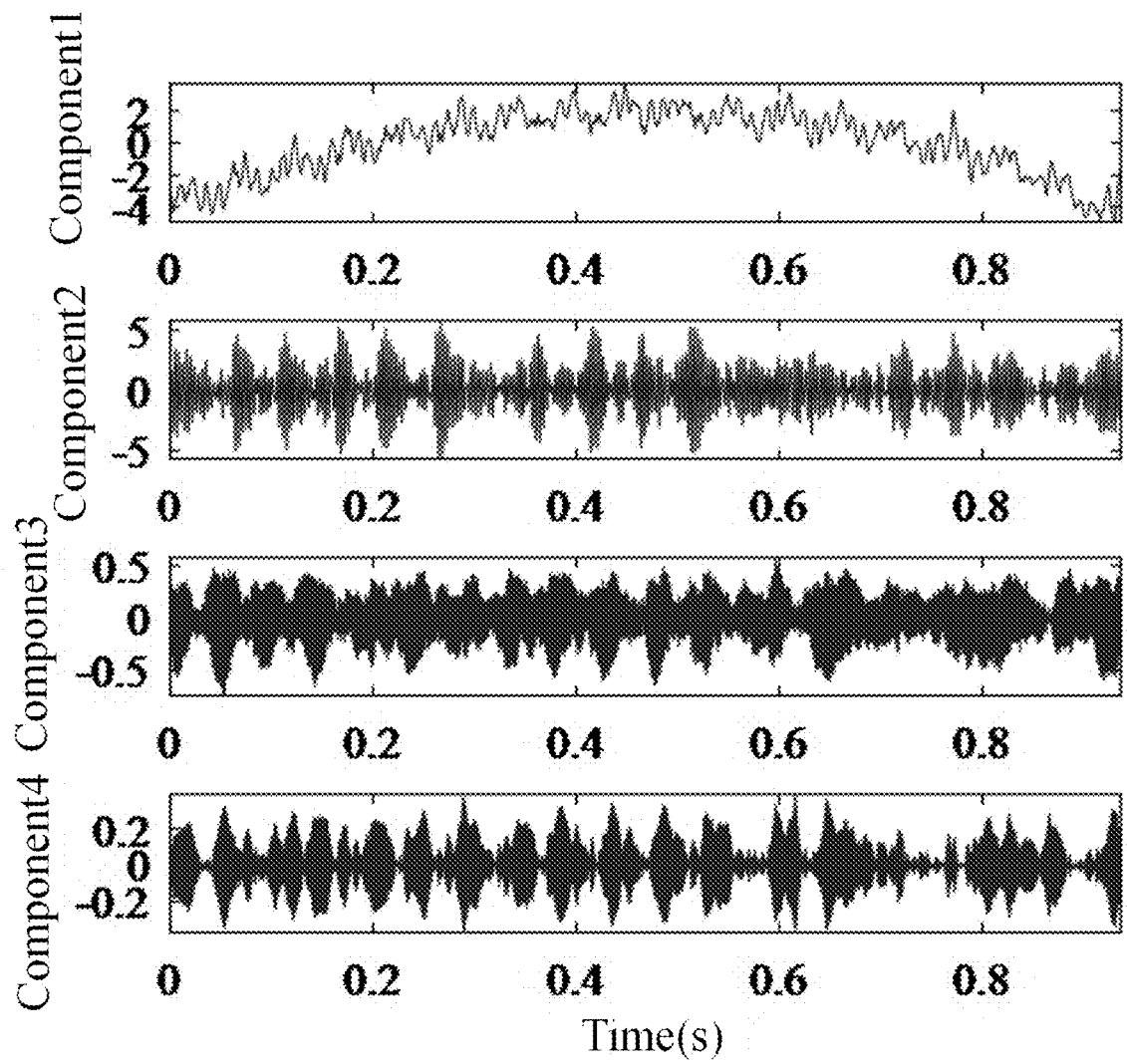
FIG. 5 is a waveform diagram of four components of the dynamic signal in FIG. 4 obtained through intelligent decomposition by using a fault diagnosis method according to an embodiment of the present invention.
Figure 6:
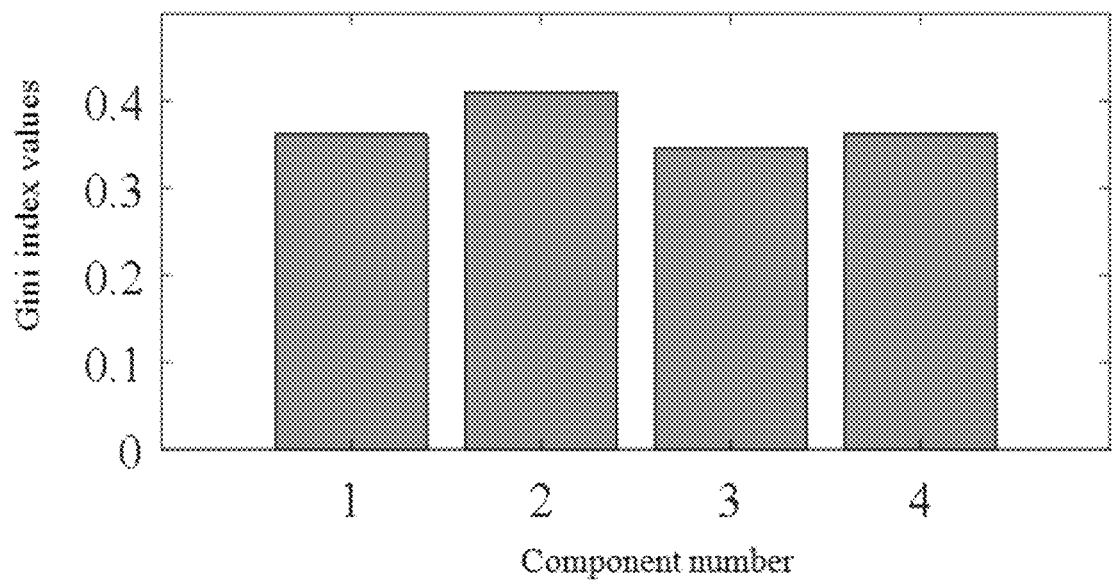
FIG. 6 is a histogram of determining a fault related component by using a Gini index.

In the technical solution in this embodiment, a fault diagnosis method is used to diagnose the dynamic signal x(t) of damage of the gearbox shown in FIG. 4. x(t) is decomposed to obtain four modal components shown in FIG. 5. The modal components are then indicated by Gini indices to obtain a fault related component as shown in FIG. 6. It may be obtained that the second component is a faulty component.

Figure 7:
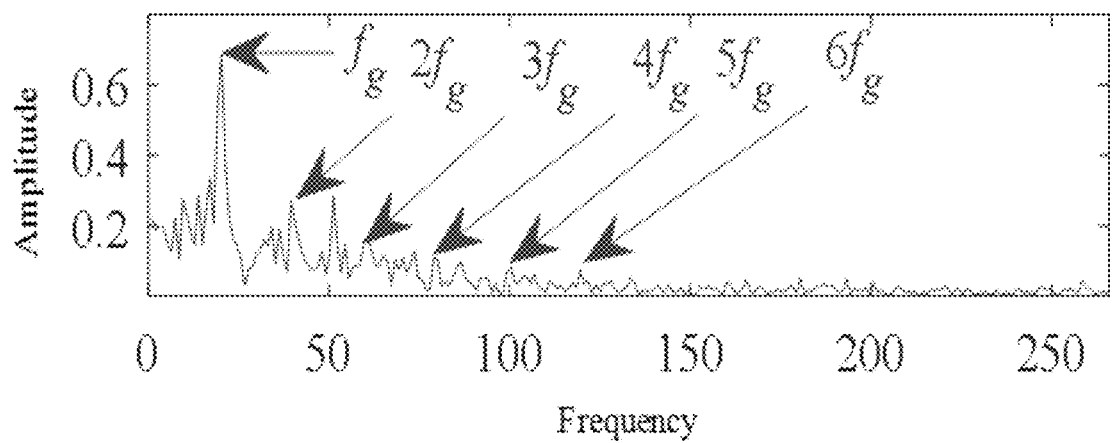
FIG. 7 is an envelope spectrum of an optimal target component including fault information retrieved with guidance of parameter optimization by a center frequency.

A center frequency is further used to guide parameter optimization to retrieve an optimal target component including fault information. An envelope spectrum of the optimal target component is shown in FIG. 7. It may be clearly observed that a feature frequency of a fault in a gear is $f_g$.

The fault diagnosis method in the technical solution in this embodiment has a capability of processing a weak fault signal in a machine, a retrieval result has high precision, the anti-interference capability is high, and the robustness is adequate.

The foregoing embodiments are merely preferred embodiments used to fully describe the present invention, and the protection scope of the present invention is not limited thereto. Equivalent replacements or variations made by a person skilled in the art to the present invention all fall within the protection scope of the present invention. The protection scope of the present invention is as defined in the claims.

What is claimed is:

1. A fault diagnosis method under a convergence trend of a center frequency, comprising steps of,
   (1) acquiring a dynamic signal x(t) of a diagnosis target by using a sampling frequency $f_s$, wherein t is a time;
   (2) setting initial decomposition parameters of a variational model: an initial center frequency $\omega_0$ is 0, an increase step size $\Delta\omega$ of the initial center frequency is 100 Hz, an initial step count z is 1, a balance parameter $\alpha$ is [1000,4000], and a quantity K of modal components is 1, wherein K is a positive integer;
   (3) performing primary decomposition on the dynamic signal x(t) by using the variational model with the set initial decomposition parameters, determining a convergence trend of a center frequency, and traversing a signal analysis band and performing iterative decomposition on the dynamic signal x(t) under the guidance of the convergence trend of the center frequency, to obtain optimized modals $\{m_1 \ldots m_n \ldots m_N\}$ and corresponding center frequencies $\{\omega_1 \ldots \omega_n \ldots \omega_N\}$, wherein N is a positive integer and n is a positive integer between 1 and N;
   (4) searching the obtained optimized modals $\{m_1 \ldots m_n \ldots m_N\}$ for a fault related modal $m_f$, guiding parameter optimization by using the center frequency $\omega_f$ of the fault related modal $m_f$, and retrieving an optimal target component $\overline{m_f}$ including fault information, wherein I is a positive integer; and
   (5) performing envelopment analysis on the retrieved optimal target component $\overline{m_f}$, and diagnosing a rotary machine equipment according to an envelope spectrum of the target component.

2. The fault diagnosis method under a convergence trend of a center frequency according to claim 1, wherein in step (3), a constraint model in the variational model is calculated by using an alternating direction method of multipliers:

$$L(m_k, \omega_k) = \alpha \sum_{k=1}^{K} \left\| \partial_t \left[ \left( \delta(t) + \frac{j}{\pi t} \right) * m_k \right] e^{-j\omega_k t} \right\|_2^2 + \left\| x(t) - \sum_{k=1}^{K} m_k \right\|_2^2,$$

where in the formula, x(t) is the dynamic signal, * represents a convolution operator, $\partial_t$ represents calculating a partial derivative of time t, $\delta(t)$ is a Dirichlet distribution function, and an exponential regulation item $e^{-j\omega_k t}$ is used for translating the frequency spectrum of each component; and the signal x(t) is decomposed into K modal components $m_k$(k=1, 2, 3 . . . K), wherein each modal component $m_k$ surrounds its center frequency $\omega_k$.

3. The fault diagnosis method under a convergence trend of a center frequency according to claim 1, wherein performing iterative decomposition on the dynamic signal x(t) under the guidance of the convergence trend of the center frequency comprises:
   (S31) performing primary decomposition on the dynamic signal x(t) by using the variational model with the set initial decomposition parameters, to obtain the updated center frequency $\omega_1$;
   (S32) determining a convergence trend $e = \omega_1 - \omega_0$ of the center frequency:
   if the convergence trend $e = \omega_1 - \omega_0$ is an upward trend, outputting a corresponding modal component as the optimized modal $m_n$, wherein the corresponding center frequency $\omega_n$ is a retrieved optimal center frequency; or
   if the convergence trend $e = \omega_1 - \omega_0$ is a downward trend, making $\omega_0 = \omega_0 + z\Delta\omega$, and simultaneously determining whether to traverse the entire band, and if $\omega_0 = (\omega_0 + z\Delta\omega) < f_s/2$, returning to step (S31), or otherwise, stopping the iterative decomposition; and
   (S33) updating the initial center frequency $\omega_0$ with the retrieved optimal center frequency $\omega_n$, and if the new center frequency $\omega_0 < f_s/2$, returning to step (S31), or otherwise, stopping the iterative decomposition.

4. The fault diagnosis method under a convergence trend of a center frequency according to claim 1, wherein in step (4), during the searching the obtained optimized modals $\{m_1 \ldots m_n \ldots m_N\}$ for the fault related modal $m_f$, the fault related modal is determined by calculating Gini index values of the optimized modals $\{m_1 \ldots m_n \ldots m_N\}$.

5. The fault diagnosis method under a convergence trend of a center frequency according to claim 4, wherein in step (4), guiding parameter optimization by using the center frequency $\omega_f$ of the fault related modal $m_f$, and retrieving an optimal target component $\overline{m_f}$ comprising fault information comprises:
   (S51) setting two groups of initial decomposition parameters: a balance parameter is $\alpha = \alpha_0 + \Delta\alpha$, a quantity of modal components is K=1, and an initial center frequency is $\omega_f$; and a balance parameter $\alpha = \alpha_0 - \Delta\alpha$, a quantity of modal components is K=1, and an initial center frequency is $\omega_f$,
   wherein $\Delta\alpha$ is the step size of the change in the balance parameter $\alpha$;
   (S52) respectively decomposing the original dynamic signal x(t) by using the two groups of initial decomposition parameters set in step (S51), to obtain two groups of modal components $Ur_1$ and $Ul_1$;
   (S53) respectively calculating Gini index values $Gnir_1$ and $Gnil_1$ of the modal components $Ur_1$ and $Ul_1$; and
   (S54) determining the values of $Gnir_1$ and $Gnil_1$, and
   if $Gnir_1 > Gnil_1$, performing an optimization solution of incrementing a balance parameter; or
   otherwise, performing an optimization solution of decrementing a balance parameter.

6. The fault diagnosis method under a convergence trend of a center frequency according to claim 5, wherein the optimization solution of incrementing a balance parameter comprises:
   (S61) setting decomposition parameters: a balance parameter is $\alpha = \alpha_0 + i\Delta\alpha$ (i=2), a quantity of modal components is K=1, and an initial center frequency is $\omega_f$;
   (S62) decomposing the original dynamic signal x(t) by using the decomposition parameters set in the step (S61), to obtain the modal component $Ur_i$, and calculating a Gini index value $Gnir_i$ of the modal component $Ur_i$; and (S63) determining the values of $Gnir_i$ and $Gnir_{i-1}$, and if $Gnir_i > Gnir_{i-1}$, making $i=i+1$, and returning to step (S61); or otherwise, making $\overline{m_f} = Ur_{i-1}$.

7. The fault diagnosis method under a convergence trend of a center frequency according to claim 5, wherein the optimization solution of decrementing a balance parameter comprises:

(S71) setting decomposition parameters: a balance parameter is $\alpha = \alpha_0 - i\Delta\alpha (i=2)$, a quantity of modal components is K=1, and an initial center frequency is $\omega_f$;

(S72) decomposing the original dynamic signal x(t) by using the decomposition parameters set in step (S71), to obtain the modal component $Ul_i$, and calculating a Gini index value $Gnil_i$ of the modal component $Ul_i$; and (S73) determining the values of $Gnil_i$ and $Gnil_{i-1}$, and if $Gnil_i > Gnil_{i-1}$, making $i=i+1$, and returning to step (S71); or otherwise, making $\overline{m_f} = Ul_{i-1}$.

\* \* \* \* \*